United States Patent
Osindero et al.

(10) Patent No.: US 11,537,887 B2
(45) Date of Patent: *Dec. 27, 2022

(54) ACTION SELECTION FOR REINFORCEMENT LEARNING USING A MANAGER NEURAL NETWORK THAT GENERATES GOAL VECTORS DEFINING AGENT OBJECTIVES

(71) Applicant: DeepMind Technologies Limited, London (GB)

(72) Inventors: Simon Osindero, London (GB); Koray Kavukcuoglu, London (GB); Alexander Vezhnevets, London (GB)

(73) Assignee: DeepMind Technologies Limited, London (GB)

(*) Notice: Subject to any disclaimer, the term of this patent is extended or adjusted under 35 U.S.C. 154(b) by 84 days.

This patent is subject to a terminal disclaimer.

(21) Appl. No.: 16/866,753

(22) Filed: May 5, 2020

(65) Prior Publication Data

US 2020/0265313 A1    Aug. 20, 2020

Related U.S. Application Data

(63) Continuation of application No. 16/511,571, filed on Jul. 15, 2019, now Pat. No. 10,679,126, which is a
(Continued)

(51) Int. Cl.
*G06N 3/08* (2006.01)
*G06N 3/04* (2006.01)

(52) U.S. Cl.
CPC ............ *G06N 3/08* (2013.01); *G06N 3/04* (2013.01); *G06N 3/0445* (2013.01); *G06N 3/0454* (2013.01)

(58) Field of Classification Search
CPC .......... G06N 3/08; G06N 3/04; G06N 3/0445; G06N 3/0454
See application file for complete search history.

(56) References Cited

U.S. PATENT DOCUMENTS

2015/0356199 A1    12/2015    Mei
2015/0356401 A1    12/2015    Vinyals
(Continued)

FOREIGN PATENT DOCUMENTS

CN    106056213    10/2016
JP    2005056185    3/2005

OTHER PUBLICATIONS

Léon et al., "Options Discovery with Budgeted Reinforcement Learning," in arXiv preprint arXiv:1611.06824 (2016). (Year: 2016).*
(Continued)

*Primary Examiner* — Kamran Afshar
*Assistant Examiner* — Ryan C Vaughn
(74) *Attorney, Agent, or Firm* — Fish & Richardson P.C.

(57) ABSTRACT

Methods, systems, and apparatus, including computer programs encoded on a computer storage medium, for a system configured to select actions to be performed by an agent that interacts with an environment. The system comprises a manager neural network subsystem and a worker neural network subsystem. The manager subsystem is configured to, at each of the multiple time steps, generate a final goal vector for the time step. The worker subsystem is configured to, at each of multiple time steps, use the final goal vector generated by the manager subsystem to generate a respective action score for each action in a predetermined set of actions.

20 Claims, 6 Drawing Sheets

Related U.S. Application Data continuation of application No. PCT/EP2018/054002, filed on Feb. 19, 2018.

(60) Provisional application No. 62/463,532, filed on Feb. 24, 2017.

(56) References Cited

U.S. PATENT DOCUMENTS

| | | |
|---|---|---|
| 2016/0179162 A1 | 6/2016 | Eastep et al. |
| 2017/0024643 A1 | 1/2017 | Lillicrap et al. |
| 2017/0200078 A1 | 7/2017 | Bichler |
| 2018/0032864 A1 | 2/2018 | Graepel |
| 2018/0247199 A1 | 8/2018 | Cox |

OTHER PUBLICATIONS

Dayan et al., "Feudal Reinforcement Learning," in 5 Advances in Neural Info. Processing Sys. 271-78 (1993). (Year: 1993).*
Lample et al., "Playing FPS Games with Deep Reinforcement Learning," in arXiv preprint arXiv 1609:05521 (2016). (Year: 2016).*
Decision to Grant a Patent in Japanese Appln. No. 2019-546129, dated Jul. 5, 2021, 5 pages (English translation).
Bacon et al, "The option-critic architecture" Proceedings of the 31st AAAI Conference on Artificial Intelligence, Feb. 2017, 9 pages.
Beattie et al, "Deepmind lab" arXiv, Dec. 2016, 11 pages.
Bellemare et al, "Increasing the action gap: New operators for reinforcement learning" arXiv, Dec. 2015, 14 pages.
Bellemare et al, "The arcade learning environment: An evaluation platform for general agents" arXiv, Jun. 2013, 27 pages.
Bellemare et al, "Unifying count-based exploration and intrinsic motivation" arXiv, Nov. 2016, 20 pages.
Boutilier et al, "Prioritized goal decomposition of markov decision processes: Toward a synthesis of classical and decision theoretic planning" Proceedings of 15th International Joint Conference on AI, Aug. 1997, 7 pages.
Dai et al., "Fudan-Huawei at MediaEval 2015: Detecting Violent Scenes and Affective Impact in Movies with Deep Learning," in MediaEval (2015).
Daniel et al, "Probabilistic inference for determining options in reinforcement learning" Machine Learning, Aug. 2016, 21 pages.
Dayan et al, "Feudal reinforcement learning" Journal of Artificial Intelligence Research, 2000, 8 pages.
Dayan, "Improving generalization for temporal difference learning: The successor representation" Neural Computation, 1993, 12 pages.
Dietterich, "Hierarchical reinforcement learning with the maxq value function decomposition" Journal of Artificial Intelligence Research, Nov. 2000, 77 pages.
Esteban et al., "Predicting Clinical Events by Combining Static and Dynamic Information using Recurrent Neural Networks," in 2016 IEEE Intl. Conf. Healthcare Informatics 93-101.
Gregor et al, "Variational Intrinsic Control" arXiv, Nov. 2016, 15 pages.
Heess et al, "Learning and transfer of modulated locomotor controller", arXiv, Oct. 2016, 13 pages.
Hochreiter et al, "Long short-term memory" Neural computation, 1997, 32 pages.
Jaderberg et al, "Reinforcement learning with unsupervised auxiliary tasks" arXiv, Nov. 2016, 14 pages.
Kaelbling, "Hierarchical learning in stochastic domains: Preliminary results" 2014, 7 pages.
Koutnik et al, "A clockwork RNN" Journal of Machine Learning Research, Jun. 2014, 9 pages.
Kulkarni et al, "Hierarchical deep reinforcement learning: integrating temporal abstraction and intrinsic motivation" arXiv, May 2016, 14 pages.
Lake et al, "Building machines that learn and think like people" arXiv, Nov. 2016, 58 pages.
Le Paine et al, "Fast wavenet generation algorithm" arXiv, Nov. 2016, 6 pages.
Leon et al, "Options discovery with budgeted reinforcement learning", arXiv, Feb. 2017, 8 pages.
Levine et al., "End-to-end training of deep visuomotor policies" arXiv, Apr. 2016, 40 pages.
Lillicrap et al, "Continuous control with deep reinforcement learning" arXiv, Jul. 2019, 14 pages.
Mnih et al, "Asynchronous methods for deep reinforcement learning" arXiv, Jun. 2016, 19 pages.
Mnih et al, "Human-level control through deep reinforcement learning" Nature, Feb. 2015, 13 pages.
Morris, "Spatial localization does not require the presence of local cues" Learning and Motivation, 1981, 22 pages.
Mozer, "A focused back-propagation algorithm for temporal pattern recognition" Complex Systems, 1989, 33 pages.
Parr et al, "Reinforcement learning with hierarchies of machines" NIPS, 1998, 7 pages.
PCT International Preliminary Report on Patentability in International Appln. No. PCT/EP2018/054002, dated Aug. 27, 2019, 9 pages.
PCT International Search Report and Written Opinion in International Application No. PCT/EP2018/054002, dated Jun. 4, 2018, 16 pages.
Precup et al, "Planning with closed-loop macro actions" Technical Report, 1997, 7 pages.
Precup et al, "Theoretical results on reinforcement learning with temporally abstract options" European Conference on Machine Learning, Apr. 1998, 12 pages.
Precup, "Temporal abstraction in reinforcement learning" PhD thesis, University of Massachusetts, 2000.
Schaul et al, "Universal value function approximators" ICML, 2015, 9 pages.
Schmidhuber, "Neural sequence chunkers" Technical Report, Apr. 1991, 17 pages.
Schulman et al, "High-dimensional continuous control using generalized advantage estimation" arXiv, Oct. 2018, 14 pages.
Schulman et al, "Trust region policy optimization" arXiv, Apr. 2017, 16 pages.
Shi et al., "Convolutional LSTM Network: A Machine Learning Approach for Precipitation Nowcasting," in Advances in Neural Info, Processing Systems 802-810 (2015).
Sutton et al, "Between mdps and semi-mdps: A framework for temporal abstraction in reinforcement learning" Artificial Intelligence, Dec. 1999, 31 pages.
Sutton, "Td models: Modeling the world at a mixture of time scales" Proceedings of the 12th International Conference on Machine Learning, 1995, 9 pages.
Tessier et al, "A deep hierarchical approach to lifelong learning in minecraft" arXiv, Nov. 2016, 10 pages.
Vezhnevets et al, "Strategic Attentive Writer for Learning Macro-Actions", arXiv, Jun. 2016, 10 pages.
Vezhnevets et al., "FeUdal Networks for Hierarchical Reinforcement Learning," in 70 Proceedings of the 34th Intl. Conf. Machine Learning 3540-3549 (2017). (Year: 2017).
Warier et al., "Embed to Control: A Locally Linear Latent Dynamics Model for Control from Raw Images," in Advances in Neural Info, Processing Sys. 2746-54 (2015). (Year: 2015).
Wiering et al, "Hq-learning" Adaptive Behavior, 1997, 19 pages.
Williams et al., "End-to-end LSTM-based Dialog Control Optimized with Supervised and Reinforcement Learning," in arXiv preprint arXiv: 1606.01269 (2016).
Yu et al, "Multi-scale context aggregation by dilated convolutions" arXiv, Apr. 2016, 13 pages.
Office Action in European Appln. No. 18705929.0, dated Nov. 4, 2021, 9 pages.
JP Office Action in Japanese Appln. No. 2019-546129, dated Oct. 19, 2020, 6 pages (English translation).
Office Action in Japanese Appln. No. 2021127574, dated Sep. 5, 2022, 6 pages (with English translation).

(56) References Cited

OTHER PUBLICATIONS

Office Action in Chinese Appln. No. 201880013632.8, dated Oct. 8, 2022, 17 pages (with English translation).

\* cited by examiner

ACTION SELECTION FOR REINFORCEMENT LEARNING USING A MANAGER NEURAL NETWORK THAT GENERATES GOAL VECTORS DEFINING AGENT OBJECTIVES

CROSS-REFERENCE TO RELATED APPLICATION

This application is a continuation of U.S. application Ser. No. 16/511,571, filed Jul. 15, 2019, which is a continuation of International Application No. PCT/EP2018/054002, filed Feb. 19, 2018, which claims the benefit under 35 U.S.C. 119 of Provisional Application No. 62/463,532, filed Feb. 24, 2017, all of which are incorporated by reference.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes an action selection system that selects actions to be performed by a reinforcement learning agent interacting with an environment.

In a first aspect, an action selection system is provided for selecting actions to be performed by an agent that interacts with an environment by performing actions from a predetermined set of actions, the system comprising: a manager neural network subsystem that is configured to, at each of a plurality of time steps: receive an intermediate representation of a current state of the environment at the time step, map the intermediate representation to a latent representation of the current state in a latent state space, process the latent representation using a goal recurrent neural network, wherein the goal recurrent neural network is configured to receive the latent representation and to process the latent representation in accordance with a current hidden state of the goal recurrent neural network to generate an initial goal vector in a goal space for the time step and to update the internal state of the goal recurrent neural network, and pool the initial goal vector for the time step and initial goal vectors for one or more preceding time steps to generate a final goal vector for the time step; a worker neural network subsystem that is configured to, at each of the plurality of time steps: receive the intermediate representation of the current state of the environment at the time step, map the intermediate representation to a respective action embedding vector in an embedding space for each action in the predetermined set of actions, project the final goal vector for the time step from the goal space to the embedding space to generate a goal embedding vector, and modulate the respective action embedding vector for each action by the goal embedding vector to generate a respective action score for each action in the predetermined set of actions; and an action selection subsystem, wherein the action selection subsystem is configured to, at each of the plurality of time steps: receive an observation characterizing the current state of the environment at the time step, generate the intermediate representation from the observation, provide the intermediate representation as input to the manager neural network to generate the final goal vector for the time step, provide the intermediate representation and the final goal vector as input to the worker neural network to generate the action scores, and select an action from the predetermined set of actions to be performed by the agent in response to the observation using the action scores.

In some implementations, selecting the action comprises selecting the action having a highest action score.

In some implementations, generating the intermediate representation from the observation comprises processing the observation using a convolutional neural network.

In some implementations, mapping the intermediate representation to a respective action embedding vector in an embedding space for each action in the predetermined set of actions comprises: processing the intermediate representation using an action score recurrent neural network, wherein the action score recurrent neural network is configured to receive the intermediate representation and to process the intermediate representation in accordance with a current hidden state of the action score recurrent neural network to generate the action embedding vectors and to update the hidden state of the action score neural network.

In some implementations, mapping the intermediate representation to a latent representation of the current state comprises processing the intermediate representation using a feedforward neural network.

In some implementations, the goal space has a higher dimensionality than the embedding space.

In some implementations, the dimensionality of the goal space is at least ten times higher than the dimensionality of the embedding space.

In some implementations, the worker neural network subsystem has been trained to generate action scores that maximize a time discounted combination of rewards, wherein each reward is a combination of an external reward received as a result of the agent performing the selected action and an intrinsic reward dependent upon the goal vectors generated by the manager neural network subsystem.

In some implementations, the manager neural network subsystem has been trained to generate initial goal vectors that result in action scores that encourage selection of actions that move the agent in advantageous directions in the latent state space.

In some implementations, the goal recurrent neural network is a dilated long short-term memory (LSTM) neural network.

In a second aspect, a system is provided that implements a dilated LSTM neural network, wherein the dilated LSTM neural network is configured to maintain an internal state that is partitioned into r sub-states, wherein r is an integer greater than one, and wherein the dilated LSTM neural network is configured to, at each time step in a sequence of time steps: receive a network input for the time step; select a sub-state from the r sub-states; and process current values of the selected sub-state and the network input for the time step using an LSTM neural network to update the current values of the selected sub-state and to generate a network output for the time step in accordance with current values of a set of LSTM network parameters.

In some implementations, the dilated LSTM neural network is further configured to, for each of the time steps: pool the network output for the time step and the network outputs for up to a predetermined number of preceding time steps to generate a final network output for the time step.

In some implementations, pooling the network outputs comprises summing the network outputs.

In some implementations, pooling the network outputs comprises averaging the network outputs.

In some implementations, pooling the network outputs comprises selecting a highest network output.

In some implementations, the time steps in the sequence of time steps are indexed starting from 1 for the first time step in the sequence to T for the last time step in the sequence, wherein each sub-state is assigned an index ranging from 1 to r, and wherein selecting a sub-state from the r sub-states comprises: selecting the sub-state having an index that is equal to the index of the time step modulo r.

In some implementations, the LSTM neural network comprises a plurality of LSTM layers.

In some implementations, processing current values of the selected sub-state and the network input for the time step using an LSTM neural network to update the current values of the selected sub-state and to generate a network output for the time step in accordance with current values of a set of LSTM network parameters comprises: setting an internal state of the LSTM neural network to the current values of the selected sub-state for the processing of the network input at the time step.

The above aspects can be implemented in any convenient form. For example, aspects and implementations may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs.

Particular embodiments of the subject matter described in this specification can be implemented so as to realize one or more of the following advantages. The structure of the action selection system as described in this specification, including one or both of the decoupled manager—worker system structure and the dilated LSTM network, enables the system to be effectively trained to perform long timescale credit assignment (i.e., to recognize the influence of previous states and actions over many previous time steps on received rewards). In particular, the structure of the action selection system enables gradients backpropagated through the system in response to a reward received at a given time step (in accordance with a reinforcement learning algorithm) to take into account states and actions over many previous time steps in adjusting the parameters of the system. Because long timescale credit assignment is facilitated by the structure of the action selection system, training the action selection system as described in this specification may consume fewer computational resources (e.g., memory and computing power) than training other action selection systems with different structures. In particular, the action selection system as described in this specification may require fewer training iterations to perform a task with a certain performance (e.g., long-term time discounted reward received by the agent while performing the task) than another system with a different structure.

Moreover, the manager system of the action selection system as described in this specification generates directional goals for the worker system rather than absolute goals. Specifically, the worker system is trained to generate actions that cause the latent state representation of the manager system to move in advantageous directions in the latent state space rather than being trained to explicitly cause the latent state representation to approach absolute goals in the latent state space. The worker system can generate actions that cause the latent state representation of the manager system to move in particular directions in the latent state space more effectively than it can generate actions that cause the latent state representation to approach absolute goals in the latent state space. Therefore, by using directional goals rather than absolute goals, the action selection system as described in this specification may achieve superior performance (e.g., higher long-term time discounted reward received by the agent) and faster training (thereby consuming fewer computational resources) than systems which use absolute goals.

A dilated long short-term memory (LSTM) neural network as described in this specification can effectively preserve its internal memory over a large number of time steps while still being able to generate an output at each time step and learn from every input. Thus, the dilated LSTM neural network is able to generate outputs for sequences where a given output can depend on an input much earlier in the input sequence. Therefore, incorporating a dilated LSTM network into an action selection system as described in this specification may improve the performance of an agent interacting with an environment based on actions selected by the action selection system (e.g., by improving the performance of the agent on a particular task as reflected in an increase in the long-term time discounted reward received by the agent while performing the particular task).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
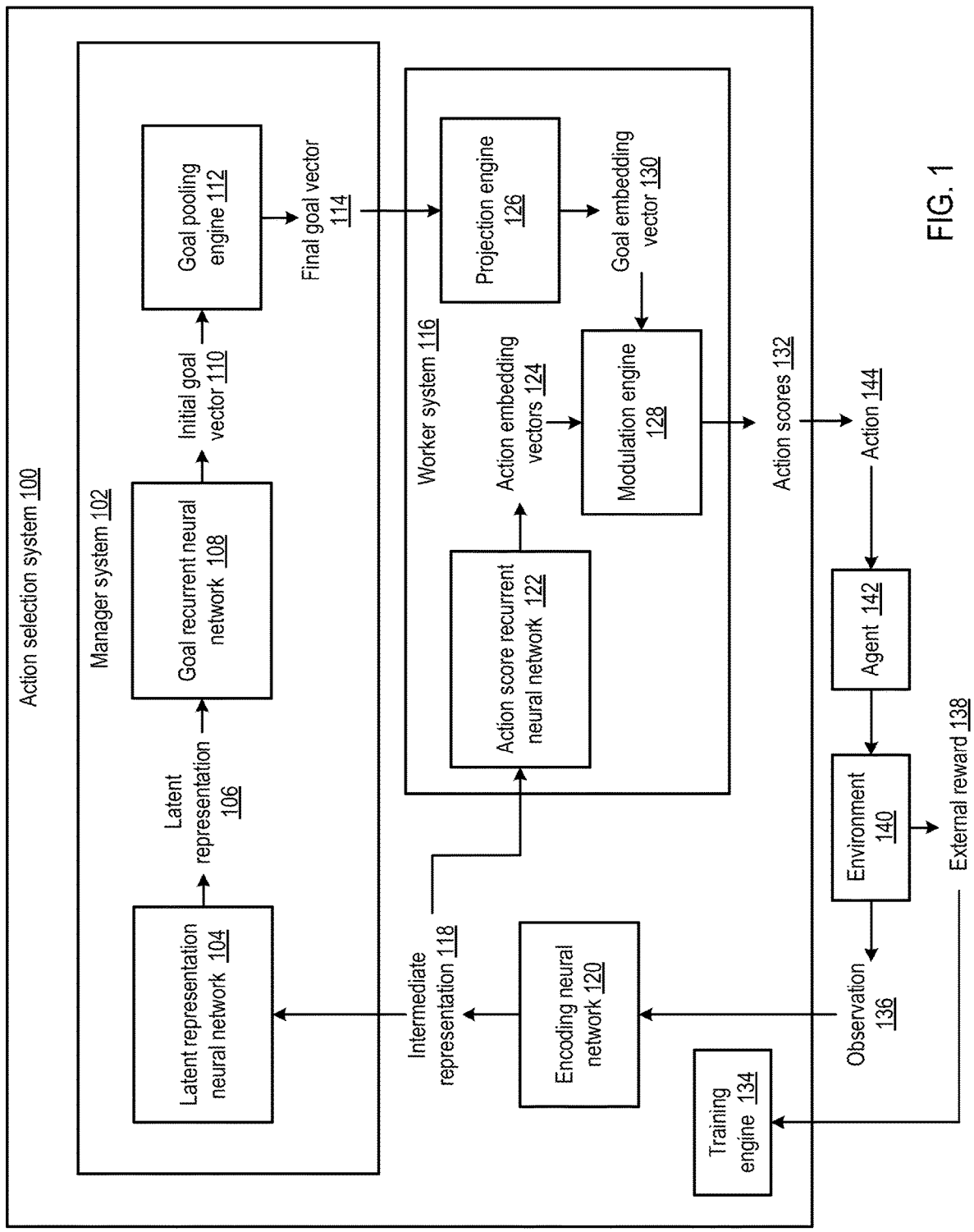
FIG. 1 is an illustration of an example action selection system.

FIG. 1 shows an example action selection system 100. The action selection system 100 is an example of a system implemented as computer programs on one or more computers in one or more locations in which the systems, components, and techniques described below are implemented.

The action selection system 100 selects actions 144 to be performed by an agent 142 interacting with an environment 140 at each of multiple time steps. In order for the agent 142 to interact with the environment 140, the system 100 receives an observation 136 characterizing the current state of the environment 140 and selects an action 144 to be performed by the agent 142 in response to the received observation 136.

In some implementations, the environment 140 is a simulated environment and the agent 142 is implemented as one or more computer programs interacting with the simulated environment by navigating through the simulated environment. For example, the simulated environment may be a video game and the agent 142 may be a simulated user playing the video game by navigating through the simulated environment. As another example, the simulated environment may be a motion simulation environment, e.g., a driving simulation or a flight simulation, and the agent 142 is a simulated vehicle navigating through the motion simulation environment. In these cases, the actions 144 may be control inputs to control the simulated user or simulated vehicle.

In some other implementations, the environment 140 is a real-world environment and the agent 142 is a mechanical agent interacting with the real-world environment. For example, the agent 142 may be a robot interacting with the environment 140 to accomplish a specific task. As another example, the agent 142 may be an autonomous or semi-autonomous vehicle navigating through the environment. In these cases, the actions 144 may be control inputs to control the robot or the autonomous vehicle.

In some of these implementations, the observations 136 may be generated by or derived from sensors of the agent 142. For example, the observations 136 may be red-green-blue (RGB) images captured by a camera of the agent 142. As another example, the observations 136 may be derived from data captured from a laser sensor of the agent 142. As another example, the observations 136 may be hyperspectral images captured by a hyperspectral sensor of the agent 142.

At each time step, the system 100 receives an external reward 138 based on the current state of the environment 140 and the action 144 of the agent 142 at the time step. Generally, the external reward is a numeric value that reflects the effect of performing the action 144 on the agent 142 accomplishing a particular task. For example, the system 100 may receive an external reward 138 for a given time step based on progress toward the agent 142 accomplishing one or more objectives. For example, an objective of the agent may be to navigate to an objective location in the environment 140.

The system 100 includes an encoding neural network 120 that is configured to receive an observation 136 for a time step, to process the observation in accordance with current values of a set of encoding neural network parameters, and to generate as output an intermediate representation 118 of the observation 136 for the time step. The intermediate representation 118 may be an ordered collection of numerical values (e.g., a vector or a matrix) that represents the observation 136 for the time step in an intermediate state space (e.g., a Euclidean space to which the intermediate representation 118 belongs). Particularly when the observation 136 is an image, the encoding neural network 120 may be a convolutional neural network.

The system 100 includes a manager system 102 and a worker system 116. At each time step, the manager system 102 is configured to generate an abstract goal (i.e., the initial goal vector 110). At each time step, the worker system 116 is configured to generate action scores 132 that cause the agent 142 to perform actions directed towards achieving the abstract goals generated by the manager system 102.

The system 100 provides the intermediate representation 118 for the time step as input to a manager system 102 that is configured to receive the intermediate representation 118 for the time step as input, to process the intermediate representation in accordance with current values of a set of manager system parameters, and to generate as output a final goal vector 114 for the time step.

The manager system includes a latent representation neural network 104 that is configured to receive the intermediate representation 118 for the time step as input, to process the intermediate representation in accordance with current values of a set of latent representation neural network parameters, and to generate as output a latent representation 106 for the time step. The latent representation 106 is an ordered collection of numerical values (e.g., a vector or a matrix) that represents the intermediate representation 118 and (indirectly) the observation 136 for the time step in a latent state space (e.g., the Euclidean space to which the latent representation 106 belongs). In some implementations, the latent representation neural network 104 is a feedforward neural network (e.g., a multi-layer perceptron). Thus the manager system may map the intermediate representation to a latent representation of the current state in the latent state space by applying an operation ($f^{Mspace}$), for example using the latent representation neural network, in order that the manager system can then define a goal using the latent state space representation. The goal may be represented by a goal vector in what may, by definition, be termed a goal space. In some implementations the latent state space may be learnt, as described later. Use of such a latent representation can facilitate setting higher level goals, and can thus facilitate learning tasks which are complex, involving sub-goals and/or which have a delayed reward.

The manager system 102 includes a goal recurrent neural network 108 that is configured to process the latent representation 106 for the time step and the internal state of the goal recurrent neural network 108 for the time step. The goal recurrent neural network 108 updates the internal state of the goal recurrent neural network 108 and generates as output an initial goal vector 110 for the time step. The initial goal vector 110 for the time step is an ordered collection of numerical values logically arranged into a vector. The goal recurrent neural network 108 can be implemented as any appropriate recurrent neural network model. In some implementations, the goal recurrent neural network 108 is an LSTM network. In some implementations, the goal recurrent neural network 108 is a dilated LSTM network. A dilated LSTM network is an LSTM network that, for each time step, generates a network output but processes and updates only a subset of its internal state. An example process for generating a network output (e.g., an initial goal vector 110) using a dilated LSTM network is described with reference to FIG. 6.

The manager system 102 includes a goal pooling engine 112 that pools, that is combines, the initial goal vector 110 for the time step and the initial goal vectors for one or more preceding time steps to generate a final goal vector 114 for the time step. The final goal vector 114 for the time step is an ordered collection of numerical values logically arranged into a vector. The final goal vector 114 varies smoothly between time steps due to the pooling operation performed by the goal pooling engine 112. An example process for generating a final goal vector for a time step using a manager system is described with reference to FIG. 3.

The system 100 provides the intermediate representation 118 for the time step and the final goal vector 114 for the time step (as generated by the manager system 102) as input to a worker system 116.

The worker system 116 is configured to process the inputs in accordance with current values of a set of worker system parameters to generate as output action scores 132. The system uses the action scores 132 to select the action 144 to be performed by the agent 142 for the time step.

The action scores 132 include a separate score for each action in a predetermined set of actions (i.e., the actions that may be taken by the agent 142). In some implementations, the system 100 selects the action 144 to be performed by the agent 142 as the action having the highest corresponding score according to the action scores 132. In some other implementations, the system determines a probability for each action in the predetermined set of actions by processing the action scores 132 by a softmax function. In these implementations, the system may select the action 144 to be performed by the agent by sampling from the probability distribution over the predetermined set of actions determined based on the action scores 132.

The worker system 116 includes an action score recurrent neural network 122 that is configured to process the intermediate representation 118 for the time step and the internal state of the action score recurrent neural network 122 for the time step. The action score recurrent neural network 122 updates the internal state of the action score recurrent neural network 122 and generates as output a set of action embedding vectors 124 for the time step. The set of action embedding vectors 124 includes an embedding vector for each action of the predetermined set of actions. An action embedding vector is an ordered collection of numerical values arranged into a vector in, by definition, an embedding space. Thus the intermediate representation may be mapped to the embedding space by the worker system, in implementations by the action score recurrent neural network of the worker system. The action score recurrent neural network 122 can be implemented as any appropriate recurrent neural network model. In some implementations, the action score recurrent neural network 122 is implemented as an LSTM network. In some implementations, the action score recurrent neural network 122 is implemented as a dilated LSTM.

The worker system 116 includes a projection engine 126 that is configured to receive the final goal vector 114 for the time step generated by the manager system 102, to process the final goal vector 114 for the time step in accordance with current values of a set of projection engine parameters, and to generate as output a goal embedding vector 130 in the embedding space. The goal embedding vector 130 is an ordered collection of numerical values arranged into a vector. In general, the goal embedding vector 130 has a lower dimensionality than the final goal vector 114. In some implementations, the dimensionality of the goal embedding vector 130 may be lower than the dimensionality of the final goal vector 114 by a factor of ten times or more (i.e., by an order or magnitude or more).

The worker system 116 includes a modulation engine 128 that is configured to receive the action embedding vectors 124 for the time step and the goal embedding vector 130 for the time step as input and to generate as output action scores 132. Thus an action embedding vector is modulated by, that is modified dependent upon a value of, the goal embedding vector, for example using the goal embedding vector to weight an action embedding vector. An example process for generating action scores for the time step using a worker system is described with reference to FIG. 4.

The system selects an action 144 to be performed by the agent 142 based on the action scores 132 generated by the worker system 116. An example process for selecting an action from a predetermined set of actions using an action selection system is described with reference to FIG. 2.

The system 100 includes a training engine 134 that is configured to train the system 100 in accordance with reinforcement learning training methods by adjusting the parameters of the system 100, including the parameters of the manager system 102, the worker system 116, and the encoding neural network 120.

In general, the training engine 134 trains the worker system 116 to generate action scores 132 that that maximize a long-term time discounted combination of the external reward 138 received as a result of the agent 142 performing the selected action 144 and an intrinsic reward determined by the training engine 134. The training engine 134 determines the intrinsic reward based on how well the action scores 132 generated by the worker system 116 cause the latent representations 106 to move in directions in the latent state space given by the initial goal vectors 110 generated by the manager system 102. The training engine 134 trains the manager system 102 to generate initial goal vectors 110 that result in action scores 132 that encourage selection of actions 144 that cause the latent representations 106 to move in advantageous directions in the latent state space (e.g., directions that result in receiving a larger long-term time discounted external reward 138). An example process for training an action selection system is described with reference to FIG. 5.

Figure 2:
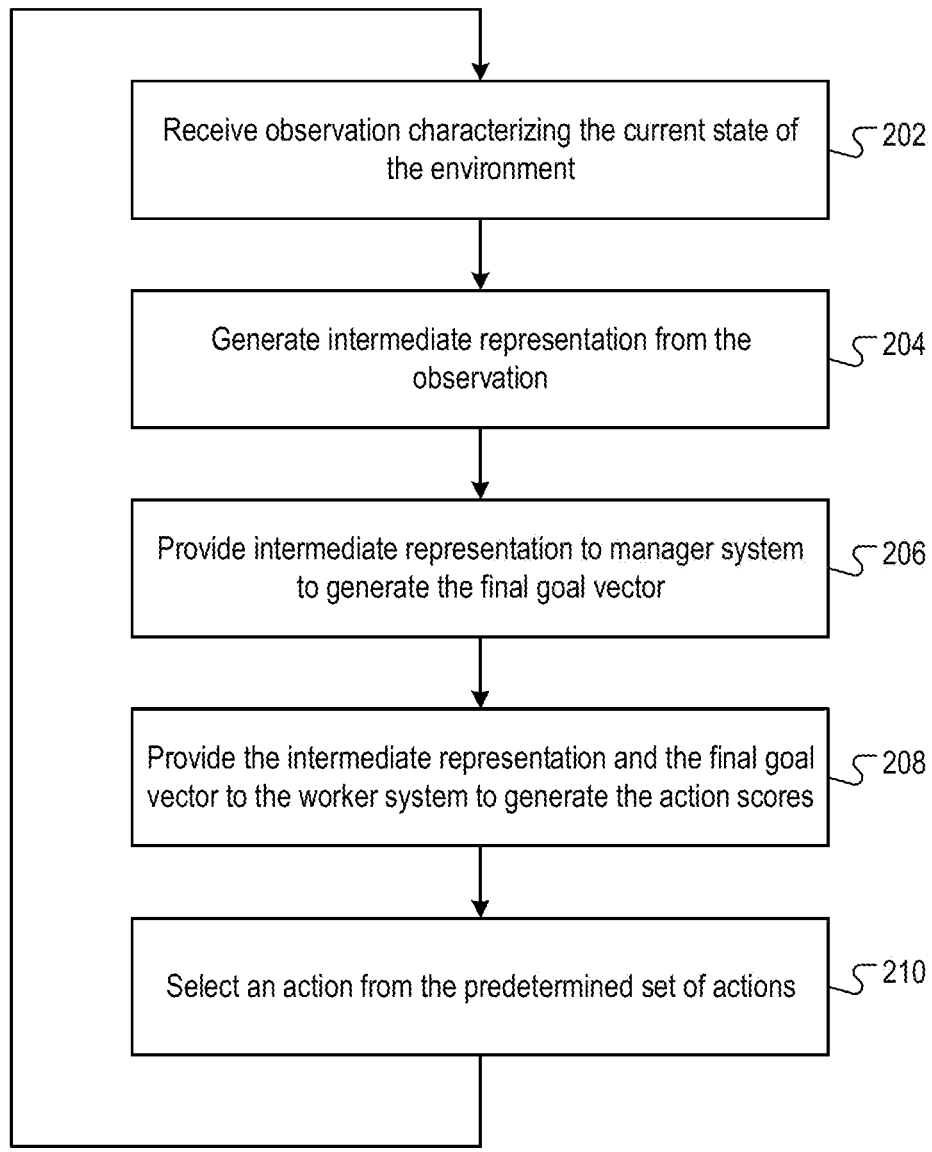
FIG. 2 is a flow diagram of an example process for selecting an action from a predetermined set of actions using an action selection system.

FIG. 2 is a flow diagram of an example process selecting an action from a predetermined set of actions using an action selection system. For convenience, the process 200 will be described as being performed by a system of one or more computers located in one or more locations. For example, an action selection system, e.g., the action selection system 100 of FIG. 1, appropriately programmed in accordance with this specification, can perform the process 200.

The system receives an observation characterizing the current state of the environment (202). In some implementations, the environment is a simulated environment and the agent is implemented as one or more computer programs interacting with the simulated environment by navigating through the simulated environment. In some other implementations, the environment is a real-world environment and the agent is a mechanical agent interacting with the real-world environment. In some implementations, the observations may be generated by or derived from sensors of the agent.

The system generates an intermediate representation of the observation for the time step (204). Specifically, the system provides the observation as input to the encoding neural network, which is configured to process the observation in accordance with current values of the set of encoding neural network parameters, and to generate as output an intermediate representation of the observation for the time step. The intermediate representation is an ordered collection of numerical values (e.g., a vector or a matrix) that represents the observation for the time step in the intermediate state space. Particularly when the observations are images, the encoding neural network may be a convolutional neural network. The values of the set of encoding neural network parameters are determined during training of the system by the training engine.

The system provides the intermediate representation for the time step to the manager system, and the manager system processes the intermediate representation for the time step to generate as output a final goal vector for the time step (206). An example process for generating a final goal vector for a time step using a manager system is described below with reference to FIG. 3.

The system provides the intermediate representation for the time step and the final goal vector for the time step (as generated by the manager system) as input to the worker system. The worker system processes the inputs for the time step to generate action scores for the time step as output (208). An example process for generating action scores for the time step using a worker system is described with reference to FIG. 4.

The system selects an action from the predetermined set of actions based on the action scores generated by the worker system (210). The action scores include a separate score for each action in the predetermined set of actions. In some implementations, the system selects the action to be performed by the agent as the action having the highest corresponding score according to the action scores. In some other implementations, the system determines a probability for each action in the predetermined set of actions by processing the action scores by a softmax function. In these implementations, the system may select the action to be performed by the agent by sampling from the probability distribution over the predetermined set of actions determined based on the action scores.

Figure 3:
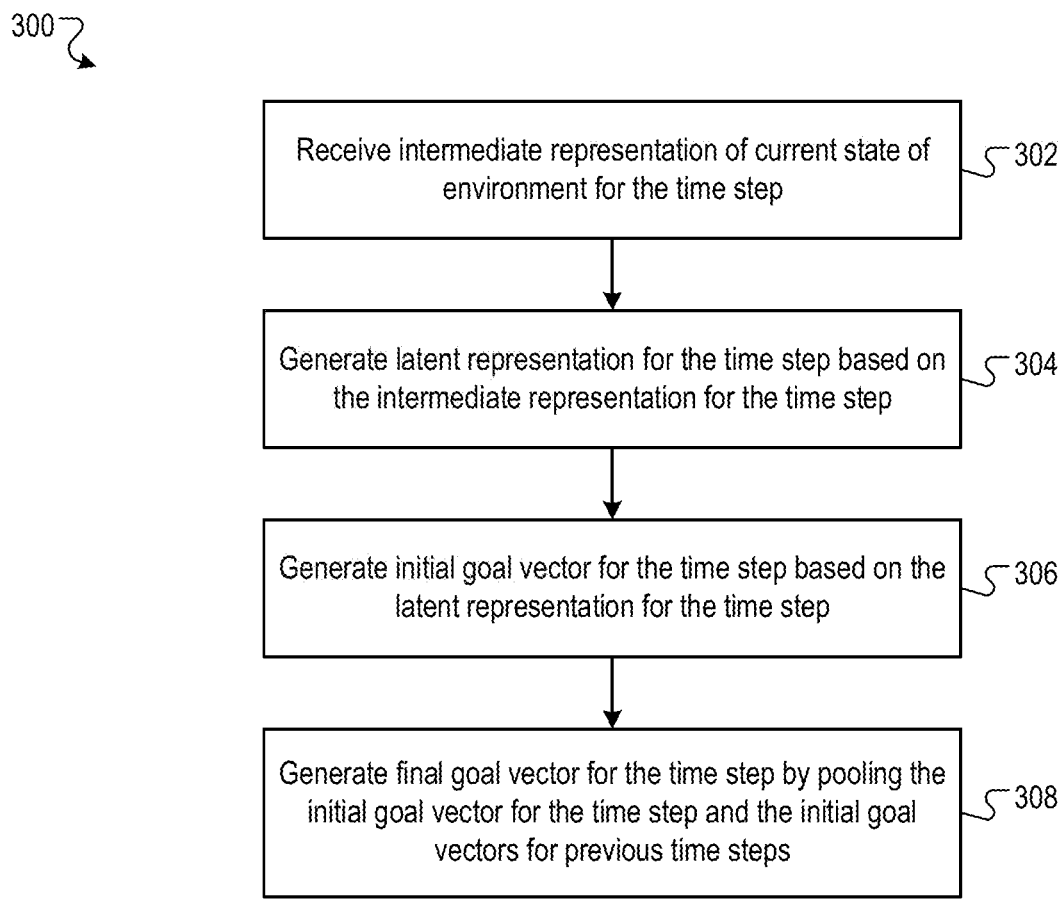
FIG. 3 is a flow diagram of an example process for generating a final goal vector for a time step using a manager system.

FIG. 3 is a flow diagram of an example process for generating a final goal vector for a time step using a manager system. For convenience, the process 300 will be described as being performed by a system of one or more computers located in one or more locations. For example, a manager system, e.g., the manager system 102 of FIG. 1, appropriately programmed in accordance with this specification, can perform the process 300.

The system receives the intermediate representation of the current state of the environment for the time step (302). In general, the intermediate representation of the current state of the environment is generated by the encoding neural network.

The system generates the latent representation for the time step by providing the intermediate representation for the time step as input to the latent representation neural network (304). The latent representation neural network is configured to process the intermediate representation for the time step in accordance with current values of the set of latent representation neural network parameters to generate as output the latent representation for the time step. In some implementations, the latent representation neural network is a feed-forward neural network (e.g., a multi-layer perceptron). The latent representation for the time step is an ordered collection of numerical values (e.g., a vector or a matrix) that represents the intermediate representation and (indirectly) the observation for the time step in the latent state space. The values of the set of latent neural network parameters are determined during training of the system by the training engine.

The system generates the initial goal vector for the time step (306). Specifically, the system provides the latent representation for the time step generated by the latent representation neural network to the goal recurrent neural network. The goal recurrent neural network is configured to process the latent representation for the time step and the internal state of the goal recurrent neural network for the time step. The goal recurrent neural network updates the internal state of the goal recurrent neural network and generates as output an initial goal vector for the time step, i.e.:

$$(h_{t+1}^M, g_t) = f^{Mrnn}(s_t, h_t^M),$$

where $h_{t+1}^M$ is the updated internal state of the goal recurrent neural network (i.e., the internal state of the goal recurrent neural network for the next time step), $h_t^M$ is the internal state of the goal recurrent neural network for the time step, $s_t$ is the latent representation for the time step, $g_t$ is the initial goal vector for the time step, and $f^{Mrnn}$ is the operation performed by the goal recurrent neural network in accordance with the current values of the set of goal recurrent neural network parameters. The initial goal vector for the time step is an ordered collection of numerical values logically arranged into a vector. In some implementations, the system normalizes the initial goal vector for the time step to have unit length (e.g., with respect to the Euclidean norm). The goal recurrent neural network can be implemented as any appropriate recurrent neural network model. In some implementations, the goal recurrent neural network is an LSTM network. In some implementations, the goal recurrent neural network is a dilated LSTM network. The values of the set of goal recurrent neural network parameters are determined during training of the system by the training engine. An example process for generating a network output (e.g., an initial goal vector) using a dilated LSTM network is described with reference to FIG. 6.

The system generates the final goal vector for the time step by pooling the initial goal vector generated by the goal recurrent neural network for the time step and the initial goal vectors generated by the goal recurrent neural network for one or more previous time steps (308). In some implementations, the system pools the initial goal vectors (i.e., the initial goal vector generated for the current time step and for the one or more previous time steps) by summing them. However the goal vectors may be combined in many other ways. The final goal vector for the time step is an ordered collection of numerical values arranged into a vector. The final goal vector varies smoothly between time steps due to the pooling operation.

Figure 4:
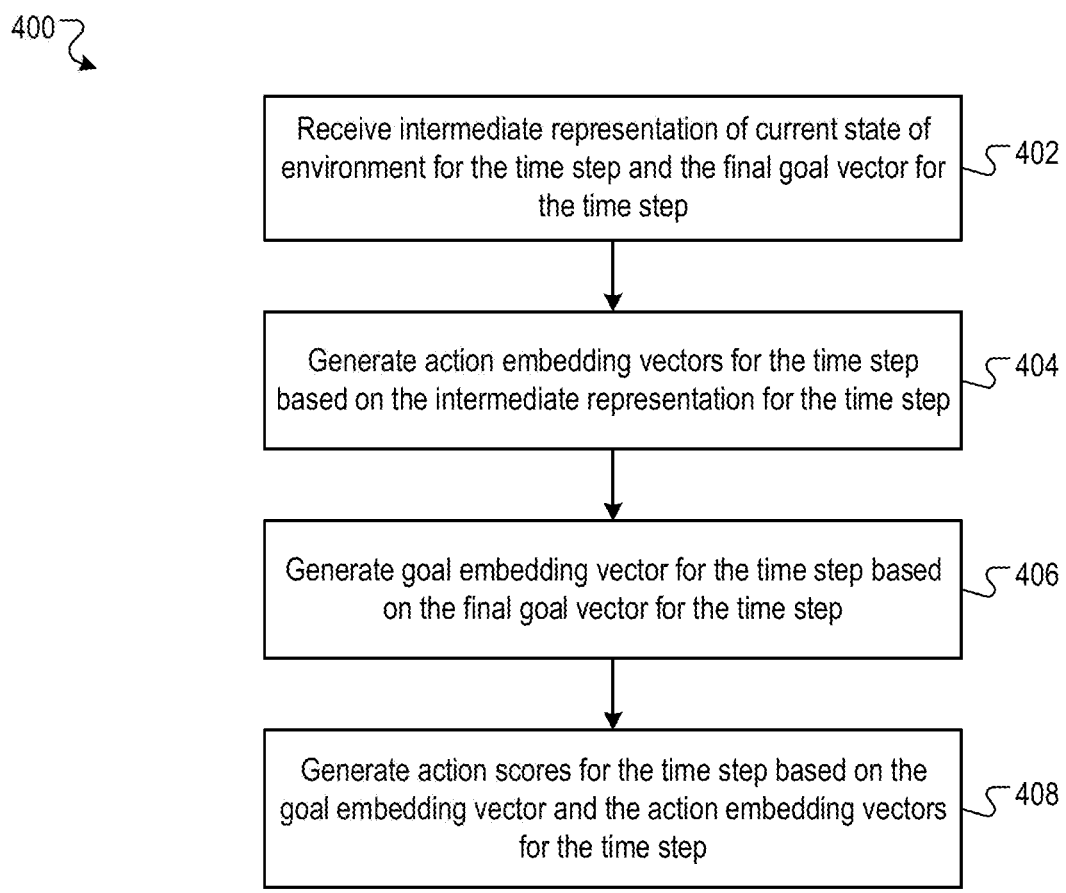
FIG. 4 is a flow diagram of an example process for generating action scores for a time step using a worker system.

FIG. 4 is a flow diagram of an example process for generating action scores for the time step using a worker system. For convenience, the process 400 will be described as being performed by a system of one or more computers located in one or more locations. For example, a worker system, e.g., the worker system 116 of FIG. 1, appropriately programmed in accordance with this specification, can perform the process 400.

The system receives the intermediate representation of the current state of the environment and the final goal vector for the time step (402). In general, the intermediate representation of the current state of the environment is generated by the encoding neural network and the final goal vector for the time step is generated by the manager system.

The system generates the action embedding vectors for the time step (404). Specifically, the system provides the intermediate representation for the time step generated by the encoding neural network to the action score recurrent neural network. The action score recurrent neural network is configured to process the intermediate representation for the time step and the internal state of the action score recurrent neural network for the time step. The action score recurrent neural network updates the internal state of the action score recurrent neural network and generates as output the action embedding vectors for the time step, i.e.:

$$(h_{t+1}^W, U_t) = f^{Wrnn}(z_t, h_t^W),$$

where $h_{t+1}^W$ is the updated internal state of the action score recurrent neural network (i.e., the internal state of the action score recurrent neural network for the next time step), $h_t^W$ is the internal state of the action score recurrent neural network for the time step, $z_t$ is the intermediate representation for the time step, $U_t$ is the set of action embedding vectors for the time step arranged into a matrix (where each row corresponds to a different action embedding vector), and $f^{Wrnn}$ is the operation performed by the action score recurrent neural network in accordance with the current values of the set of action score recurrent neural network parameters. The action score recurrent neural network can be implemented as any appropriate recurrent neural network model. For example, the action score recurrent neural network may be implemented as an LSTM network or a dilated LSTM network.

The system generates the goal embedding vector for the time step based on the final goal vector for the time step (406). Specifically, the system provides the final goal vector for the time step to the projection engine, which is configured to receive the final goal vector for the time step, to process the final goal vector for the time step in accordance with current values of the set of projection engine parameters, and to generate as output the goal embedding vector for the time step. In general, the goal embedding vector has a lower dimensionality than the final goal vector. In some implementations, the dimensionality of the goal embedding vector may be lower than the dimensionality of the final goal vector by a factor of ten times or more (i.e., by an order or magnitude or more). In some implementations, the operation of the projection engine may be given by:

$$w_t = \phi G_t,$$

$$G_t = \sum_{i=t-c}^{t} g_i,$$

where the current time step is t, $w_t$ is the goal embedding vector for the time step, $G_t$ is the final goal vector for the time step, $\phi$ is a projection matrix (i.e., a matrix with the same number of columns as the dimensionality of the vector $G_t$ and with the same number of rows as the dimensionality of the goal embedding vector $w_t$), and the final goal vector for the time step is determined (e.g., by the manager system in 308) by summing the initial goal vectors generated for the current time step and the previous c time steps, where c is a positive integer, and where gi denotes the initial goal vector generated at time step i.

The system generates action scores for the time step (408). Specifically, the system provides the goal embedding vector for the time step and the action embedding vectors for the time step as input to the modulation engine that is configured to combine the inputs to generate as output the action scores for the time step. In some implementations, the modulation engine is configured to combine the goal embedding vector for the time step and the action embedding vectors for the time step by matrix-vector multiplication, i.e.:

$$\pi_t = U_t w_t,$$

where $U_t$ is a matrix where each row of the matrix is an action embedding vector for the time step, $w_t$ is the goal embedding vector for the time step, and $\pi_t$ is the vector of action scores for the time step.

Figure 5:
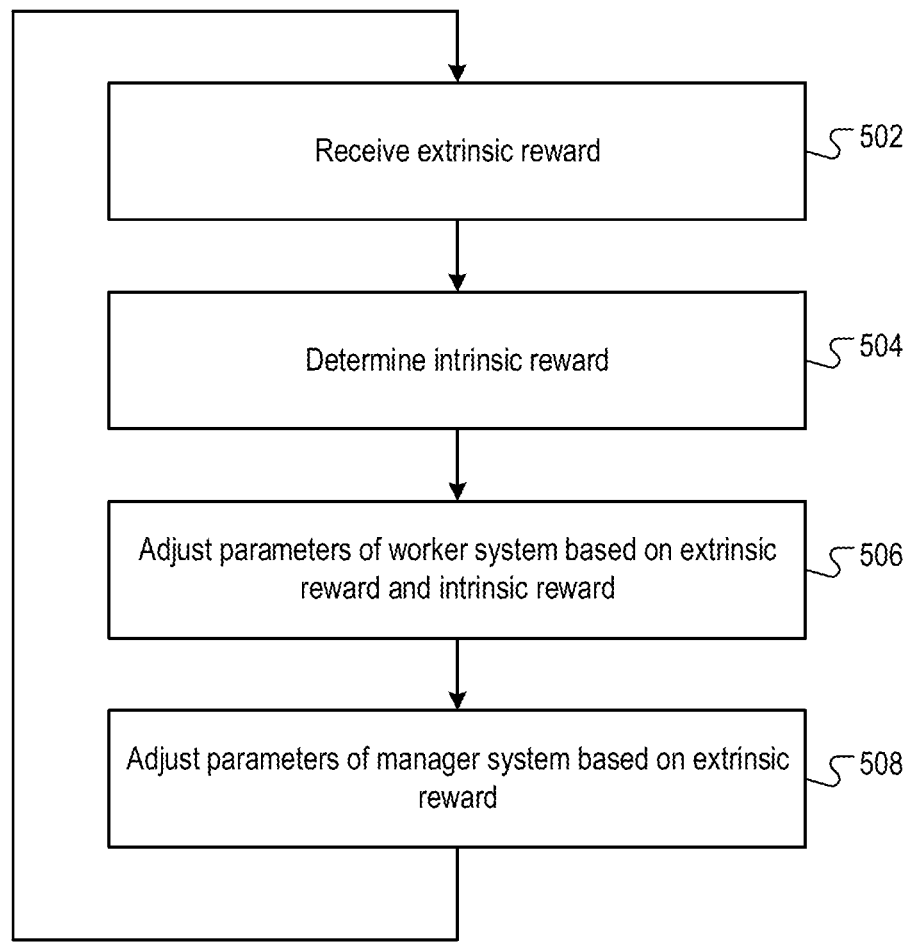
FIG. 5 is a flow diagram of an example process for training an action selection system.

FIG. 5 is a flow diagram of an example process for training an action selection system. For convenience, the process 500 will be described as being performed by an engine including one or more computers located in one or more locations. For example, a training engine, e.g., the training engine 134 of FIG. 1, appropriately programmed in accordance with this specification, can perform the process 500.

The engine receives an external reward for the time step (502). The external reward received is based on the current state of the environment and the action of the agent at the time step. Generally, the external reward is a numeric value that reflects the effect of performing the action on the agent accomplishing a particular task. In some cases, the engine may receive an external reward for a given time step based on progress toward the agent accomplishing one or more objectives. For example, an objective of the agent may be to navigate to an objective location in the environment.

The engine determines an intrinsic reward for the time step (504). In general, the engine determines the intrinsic reward based on how well the action scores generated by the worker system cause the latent representations (e.g., generated by the manager system in 304) to move in directions in the latent state space given by the initial goal vectors generated by the manager system (e.g., in 306). For example, the engine may determine the intrinsic reward for time step t by:

$$r_t^I = \frac{1}{c} \sum_{i=1}^{c} d_{cos}(s_t - s_{t-i}, g_{t-i}),$$

where $r_t^I$ is the intrinsic reward for time step t, c is a positive integer, $d_{cos}$ is the cosine similarity between two vectors (i.e., $d_{cos} = \alpha^T \beta / (|\alpha||\beta|)$), $s_t$ is the latent representation for time step t, $s_{t-i}$ is the latent representation for time step t−i, and $g_{t-i}$ is the initial goal vector for time step t−i. Thus the intrinsic reward may be dependent upon a difference in direction between a goal vector for a time step and a vector representing a change in the latent representation from that time step to the next.

The engine adjusts the parameters of the worker system based on the external rewards and the intrinsic rewards (506). Specifically, the engine adjusts the parameters of the modulation engine, the projection engine, the action score recurrent neural network and the encoding neural network, to cause the worker system to generate action scores that maximize a long-term time discounted combination of the external reward received as a result of the agent performing selected actions and the intrinsic reward determined by the training engine. For example, the long-term time discounted combination may be given by:

$$R_t + \alpha R_t^I,$$

$$R_t = \sum_{k=0}^{\infty} \gamma^k r_{t+k+1},$$

$$R_t^I = \sum_{k=0}^{\infty} \gamma_I^k r_{t+k+1}^I,$$

where $\gamma$ and $\gamma_I$ are discount factors between 0 and 1 (which in general may be different), $r_{t+k+1}$ is the external reward received at time step t+k+1, $r_{t+k+1}^I$ is the intrinsic reward received at time step t+k+1, and $\alpha$ is a constant that regulates the influence of the intrinsic reward and that can determined by any appropriate method (e.g., arbitrarily or by cross-validation). The engine can train the parameters of the worker system by any appropriate reinforcement learning method. For example, the engine may train the parameters of the worker system using an advantage actor critic reinforcement learning method (e.g., where value function estimates for the intrinsic and external rewards are generated by neural networks, such as multi-layer perceptrons, that receive as input the internal state of the action score recurrent neural network). In some implementations the engine trains the worker system independently of the manager system (i.e., the engine does not backpropagate gradients from the worker system and the manager system so that the goals are more than just internal variables of a unitary system). This is useful as it facilitates developing the manager system's goals, based on extrinsic reward, separately from fulfillment of the goals by the worker system, based on intrinsic reward.

The engine updates the parameters of the manager system based on the external reward (508). Specifically, the engine adjusts the parameters of the goal recurrent neural network, the latent representation neural network and the encoding neural network. The adjustments to the parameters of the manager system cause the manager system to generate initial goal vectors that result in action scores that encourage selection of actions that cause the latent representations of the manager system to move in advantageous directions in the latent state space. A direction in the latent state space is said to be advantageous if, for example, the latent representation moving in that direction results in receiving a larger long-term time discounted external reward. In some implementations, the parameters of the manager system may be updated by gradient ascent, where the gradient at time step t+c is given by:

$$A_t^M \nabla_\theta d_{cos}(s_{t+c} - s_t, g_t(\theta)),$$

$$A_t^M = \Sigma_{i=0}^{t+c-1} \gamma^i r_{t+1} + \gamma^{t+c} V^M(x_{t+c}; \theta) - V^M(x_t, \theta)$$

where $\theta$ refers to the parameters of the manager system, $\nabla_\theta$ refers to the derivative with respect to the parameters $\theta$, c is a positive integer referred to as the horizon that defines the temporal resolution of the manager system, $d_{cos}$ is the cosine similarity between two vectors (as described above), $s_{t+c}$ is the latent representation at time t+c, $s_t$ is the latent representation at time t, $g_t(\theta)$ is the initial goal vector for time step t (with the notation making explicit the dependence on the parameters $\theta$), $A_t^M$ is referred to as the advantage function of the manager system, and $V^M(x_t, \theta)$ is a value function estimate computed based on the parameters $\theta$ and the observation $x_t$ for time step t (i.e., the expected long-term time discounted external reward from a time step where the observation of the environment is given by $x_t$). The value function estimate $V^M(x_t, \theta)$ is determined using a neural network (e.g., a multi-layer perceptron) that receives as input the internal state of the goal recurrent neural network and is trained (e.g., by gradient backpropagation) to generate accurate estimates of the expected long-term time discounted external reward. In these implementations, the engine backpropagates gradients to adjust the parameters of the manager system after every c time steps.

Figure 6:
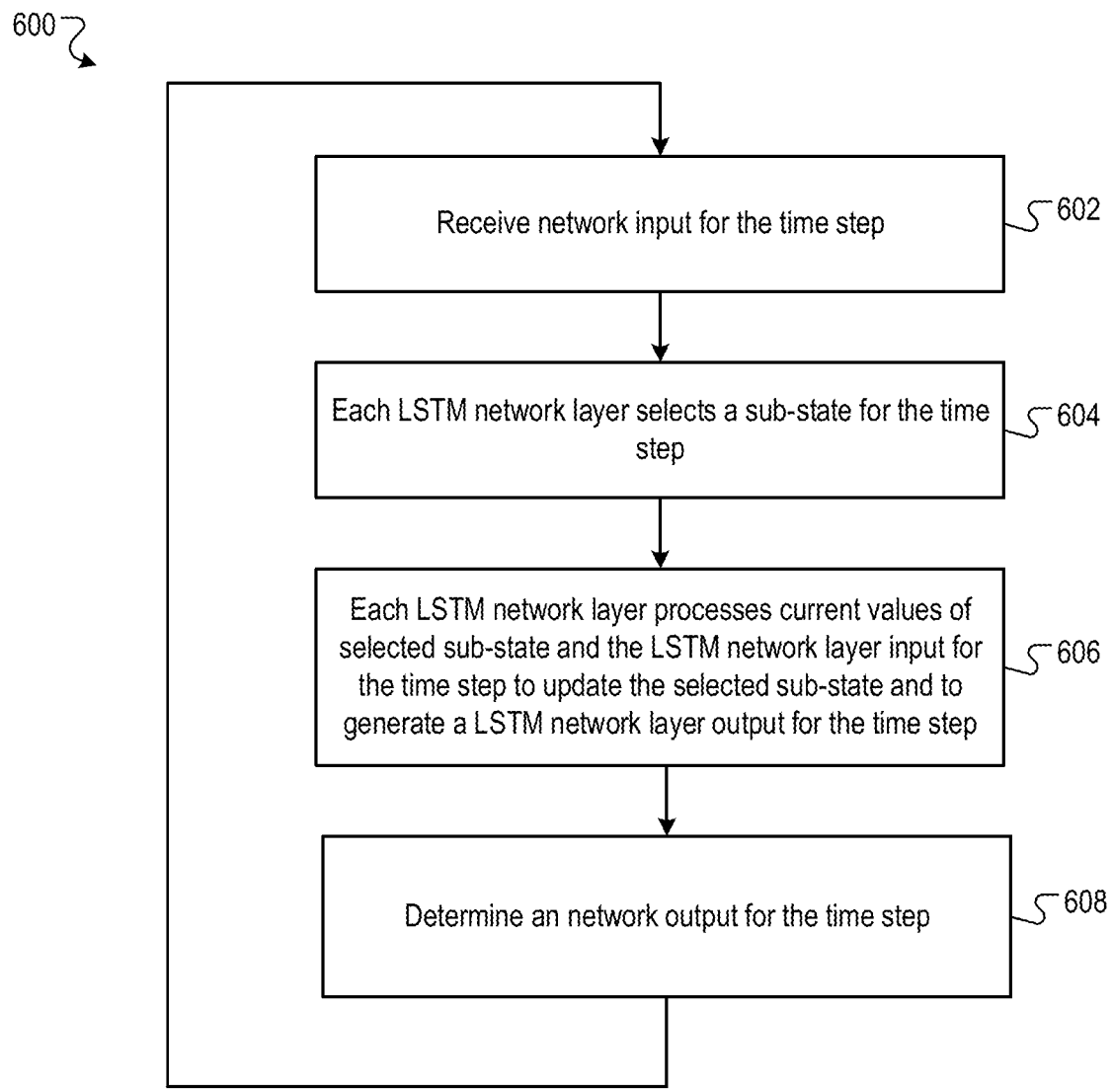
FIG. 6 is a flow diagram of an example process for generating a network output using a dilated long short-term memory (LSTM) network.

FIG. 6 is a flow diagram of an example process for generating a network output using a dilated LSTM network. For convenience, the process 600 will be described as being performed by a neural network including one or more computers located in one or more locations. For example, a neural network, e.g., the goal recurrent neural network 108 of FIG. 1, appropriately programmed in accordance with this specification, can perform the process 600.

In general, a dilated LSTM network is an LSTM network including a sequence of one or more LSTM network layers that each maintain an internal state that is partitioned into multiple disjoint sub-states. The internal state of an LSTM network layer is an ordered collection of numerical values (e.g., represented as a vector or matrix). A sub-state of the internal state of an LSTM network layer is a subset of the ordered collection of numerical values of the internal state.

The network receives a network input for the time step (602). In general, the network receives a respective network input for each time step in sequence of time steps. For example, the network input for the time step may be the latent representation for the time step generated by the latent representation neural network.

Each LSTM network layer selects a sub-state for the time step (604). The time steps in the sequence of time steps may be indexed starting from 1 for the first time step in the sequence to T for the last time step in the sequence and, for a particular LSTM network layer, each sub-state of the LSTM network layer may be assigned an index ranging from 1 to r. The particular LSTM network layer may select a sub-state for the time step that has a sub-state index that is equal to the index of the time step modulo r. For example, if each time step is assigned an index from 1 to 10 and each sub-state is assigned an index from 1 to 3, then the sub-state selected for the time step assigned index 1 would be the sub-state assigned index 1, and the sub-state selected for the time step assigned index 5 would be the sub-state assigned index 2.

The current values of a sub-state may comprise the output values of the nodes of the LSTM network layer(s) indexed by the sub-state. For each LSTM network layer, the LSTM network layer processes the current values of the sub-state selected for the time step and an input for the time step in accordance with a set of LSTM network layer parameters to update the current values of the sub-state selected for the time step and to generate an output for the time step (606). The first LSTM network layer in the sequence receives the network input for the time step. Each subsequent LSTM network layer receives the output of the previous LSTM network layer in the sequence for the time step as input for the time step. Each LSTM network layer may perform the operation:

$$(h_{t+1}^{t \% r}, g_t) = \text{LSTM}(s_t, h_t^{t \% r}; \theta^{LSTM}),$$

where t is the current time step, r is the number of sub-states of the LSTM network layer, % refers to the modulo operation, $h_{t+1}^{t \% r}$ refers to the updated values of the sub-state of the LSTM network layer indexed by t % r (i.e., the values of the sub-state indexed by t % r at time step t+1), $h_t^{t \% r}$ refers to the values of the sub-state of the LSTM network layer indexed by t % r at time step t, g refers to the LSTM network layer output for the time step, $s_t$ refers to the LSTM network layer input for the time step, $\theta^{LSTM}$ refers to the set of LSTM network layer parameters, and LSTM refers to the operation performed by the LSTM network layer in accordance with the set of LSTM network layer parameters $\theta^{LSTM}$. In general, the set of LSTM network layer parameters $\theta^{LSTM}$ used by each LSTM network layer to process the inputs is independent of the sub-state selected for the time step. Different LSTM network layers may have different LSTM network layer parameter values. The full state of the dilated LSTM network may be specified as $\{h^i\}_{i=1}^r$ and each of the r sub-states, or groups of sub-states, may be considered to be a separate "core" of the dilated LSTM network.

The network determines a network output for the time step (608). In some implementations, the network determines the network output for the time step to be the output of the final LSTM network layer for the time step. In some other implementations, the network determines the network output for the time step by pooling, i.e. combining, the output of the final LSTM network layer for the time step and the output for up to a predetermined number of preceding time steps. The network may pool the final LSTM network layer outputs by summing them, by averaging them, by selecting the final LSTM network layer output with the highest norm, or by any other appropriate pooling method. This facilitates the dilated LSTM network preserving memories for longer periods.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft® Cognitive Toolkit framework, an Apache™ Singa framework, or an Apache™ MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system for selecting actions to be performed by an agent that interacts with an environment by performing actions from a predetermined set of actions, the system comprising one or more computers and one or more storage devices communicatively coupled to the one or more computers, wherein the one or more storage devices store instructions that, when executed by the one or more computers, cause the one or more computers to implement:
    a manager neural network subsystem that is configured to, at each of a plurality of time steps:
        generate a latent representation, in a latent space, of a current state of the environment at the time step;
        generate, based at least in part on the latent representation of the current state of the environment at the time step, an initial goal vector that defines, in the latent state space, an objective to be accomplished as a result of actions performed by the agent in the environment; and
        pool the initial goal vector for the time step and initial goal vectors for one or more preceding time steps to generate a final goal vector for the time step, comprising:
            generating the final goal vector for the time step by element-wise combining the initial goal vector for the time step and the initial goal vectors for one or more preceding time steps;
    a worker neural network subsystem that is configured to, at each of the plurality of time steps:
        generate a respective action score for each action in the predetermined set of actions based at least in part on the final goal vector for the time step; and
        select an action from the predetermined set of actions to be performed by the agent at the time step using the action scores.

2. The system of claim 1, wherein generating the initial goal vector, comprises:
    processing the latent representation using a goal recurrent neural network, wherein the goal recurrent neural network is configured to receive the latent representation and to process the latent representation in accordance with a hidden state of the goal recurrent neural network to generate the initial goal vector and to update the hidden state of the goal recurrent neural network.

3. The system of claim 2, wherein the goal recurrent neural network is a dilated long short-term memory (LSTM) neural network, wherein the dilated LSTM neural network is configured to maintain an internal state that is partitioned into r sub-states, wherein r is an integer greater than one, and wherein the dilated LSTM neural network is configured to, at each time step in the plurality of time steps:
   receive a network input for the time step;
   select a sub-state from the r sub-states; and
   process current values of the selected sub-state and the network input for the time step using an LSTM neural network to update the current values of the selected sub-state and to generate a network output for the time step in accordance with current values of a set of LSTM network parameters.

4. The system of claim 3, wherein the dilated LSTM neural network is further configured to, for each of the time steps:
   pool the network output for the time step and the network outputs for up to a predetermined number of preceding time steps to generate a final network output for the time step.

5. The system of claim 4, wherein pooling the network outputs comprises summing the network outputs.

6. The system of claim 3, wherein the time steps in the plurality of time steps are indexed starting from 1 for the first time step in the plurality of time steps to T for the last time step in the plurality of time steps, wherein each sub-state is assigned an index ranging from 1 to r, and wherein selecting a sub-state from the r sub-states comprises:
   selecting the sub-state having an index that is equal to the index of the time step modulo r.

7. The system of claim 3, wherein processing current values of the selected sub-state and the network input for the time step using an LSTM neural network to update the current values of the selected sub-state and to generate a network output for the time step in accordance with current values of a set of LSTM network parameters comprises:
   setting an internal state of the LSTM neural network to the current values of the selected sub-state for the processing of the network input at the time step.

8. The system of claim 1, wherein generating the respective action score for each action in the predetermined set of actions comprises:
   generating a respective action embedding vector in an embedding space for each action in the predetermined set of actions;
   projecting the final goal vector for the time step to the embedding space to generate a goal embedding vector; and
   modulating the respective action embedding vector for each action by the goal embedding vector to generate the respective action score for each action in the predetermined set of actions.

9. The system of claim 8, wherein generating the respective action embedding vector in the embedding space for each action in the predetermined set of actions comprises:
   processing a representation of the current state of the environment using an action score recurrent neural network, in accordance with a hidden state of the action score recurrent neural network, to generate the action embedding vectors and to update the hidden state of the action score recurrent neural network.

10. The system of claim 8, wherein the final goal vector has a higher dimensionality than the goal embedding vector.

11. The system of claim 10, wherein the dimensionality of the final goal vector is at least ten times higher than the dimensionality of the goal embedding vector.

12. The system of claim 1, wherein selecting the action comprises selecting the action having a highest action score.

13. The system of claim 1, wherein the worker neural network subsystem has been trained to generate action scores that maximize a time discounted combination of rewards, wherein each reward is a combination of an external reward received as a result of the agent performing selected actions and an intrinsic reward dependent upon goal vectors generated by the manager neural network subsystem.

14. The system of claim 13, wherein the manager neural network subsystem has been trained to generate initial goal vectors that result in action scores that encourage selection of actions that increase the external rewards received as a result of the agent performing the selected actions.

15. The system of claim 1, wherein generating the latent representation, in the latent space, of the current state of the environment at the time step comprises:
   processing an observation characterizing the current state of the environment using a convolutional neural network.

16. The system of claim 1, further comprising a training subsystem that is configured to perform operations comprising:
   determining a respective reward for each time step of the plurality of time steps, comprising, for one or more time steps:
      determining the reward for the time step based at least in part on a difference in direction between: (i) a vector representing a change in the latent representation of the state of the environment from a preceding time step to the time step, and (ii) the initial goal vector for the preceding time step; and
   training the worker neural network subsystem on the rewards using reinforcement learning techniques.

17. The system of claim 1, wherein at each of the plurality of time steps, generating the final goal vector for the time step by element-wise combining the initial goal vector for the time step and the initial goal vectors for one or more preceding time steps comprises:
   generating each value in the final goal vector for the time step by combining corresponding values from the initial goal vector for the time step and the initial goal vectors for the one or more preceding time steps.

18. The system of claim 1, wherein at each of the plurality of time steps, generating the final goal vector for the time step by element-wise combining the initial goal vector for the time step and the initial goal vectors for one or more preceding time steps comprises:
   generating the final goal vector for the time step by element-wise summing the initial goal vector for the time step and the initial goal vectors for one or more preceding time steps.

19. One or more non-transitory computer storage media storing instructions that when executed by one or more computers cause the one or more computers to perform operations for selecting actions to be performed by an agent that interacts with an environment by performing actions from a predetermined set of actions, the operations comprising, at each of a plurality of time steps:
   generating a latent representation, in a latent space, of a current state of the environment at the time step;
   generating, based at least in part on the latent representation of the current state of the environment at the time step, an initial goal vector that defines, in the latent state space, an objective to be accomplished as a result of actions performed by the agent in the environment;

pooling the initial goal vector for the time step and initial goal vectors for one or more preceding time steps to generate a final goal vector for the time step, comprising:

generating the final goal vector for the time step by element-wise combining the initial goal vector for the time step and the initial goal vectors for one or more preceding time steps;

generating a respective action score for each action in the predetermined set of actions based at least in part on the final goal vector for the time step; and selecting an action from the predetermined set of actions to be performed by the agent at the time step using the action scores.

20. A method performed by one or more data processing apparatus for selecting actions to be performed by an agent that interacts with an environment by performing actions from a predetermined set of actions, the method comprising, at each of a plurality of time steps:

generating a latent representation, in a latent space, of a current state of the environment at the time step;

generating, based at least in part on the latent representation of the current state of the environment at the time step, an initial goal vector that defines, in the latent state space, an objective to be accomplished as a result of actions performed by the agent in the environment;

pooling the initial goal vector for the time step and initial goal vectors for one or more preceding time steps to generate a final goal vector for the time step, comprising:

generating the final goal vector for the time step by element-wise combining the initial goal vector for the time step and the initial goal vectors for one or more preceding time steps;

generating a respective action score for each action in the predetermined set of actions based at least in part on the final goal vector for the time step; and selecting an action from the predetermined set of actions to be performed by the agent at the time step using the action scores.

\* \* \* \* \*